Nov. 8, 1932.    P. WITTE    1,886,459
AUTOMATIC MACHINE FOR MAKING TUBES
Filed April 21, 1932    5 Sheets-Sheet 1

INVENTOR
PAUL WITTE.
BY
ATTORNEY

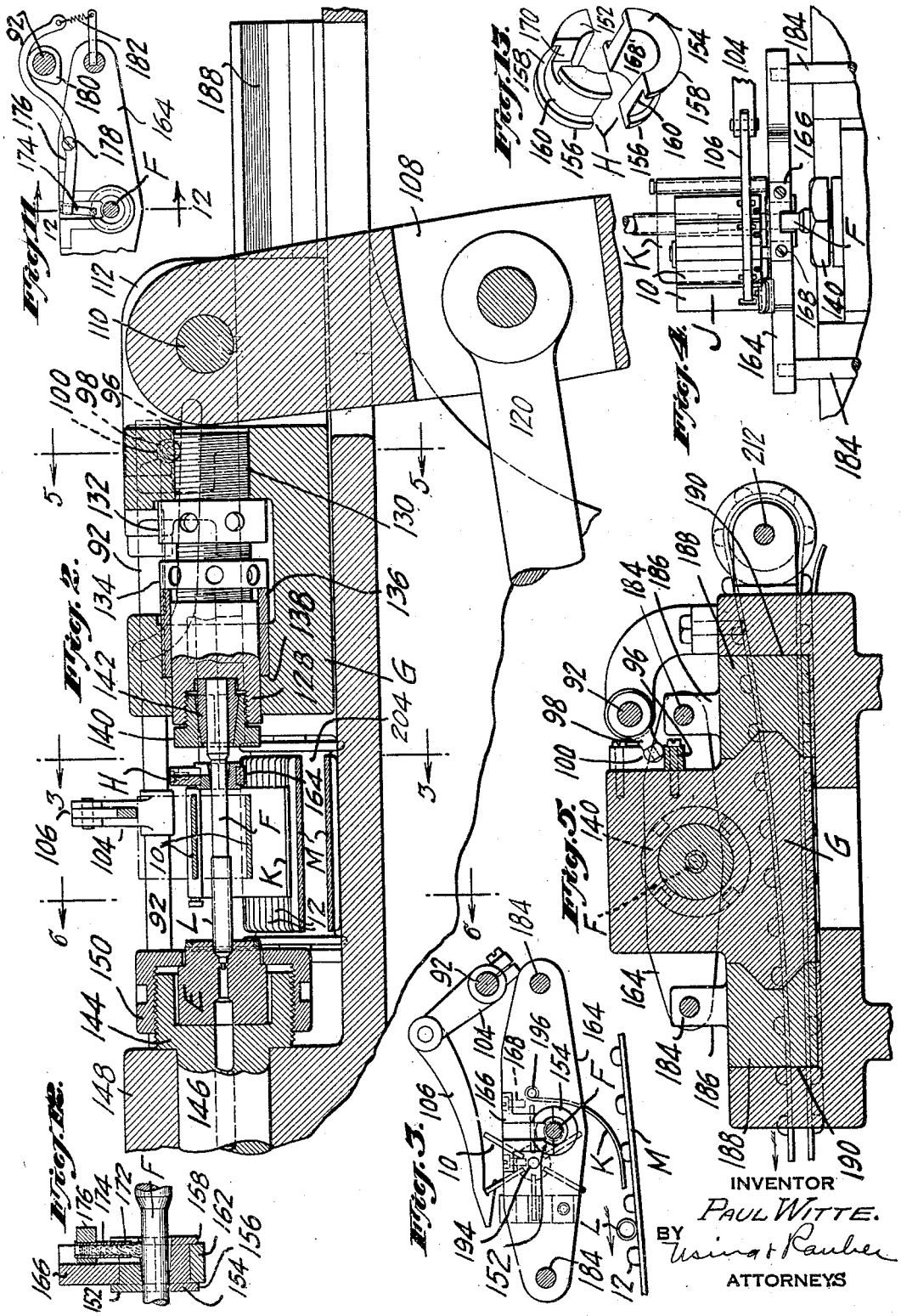

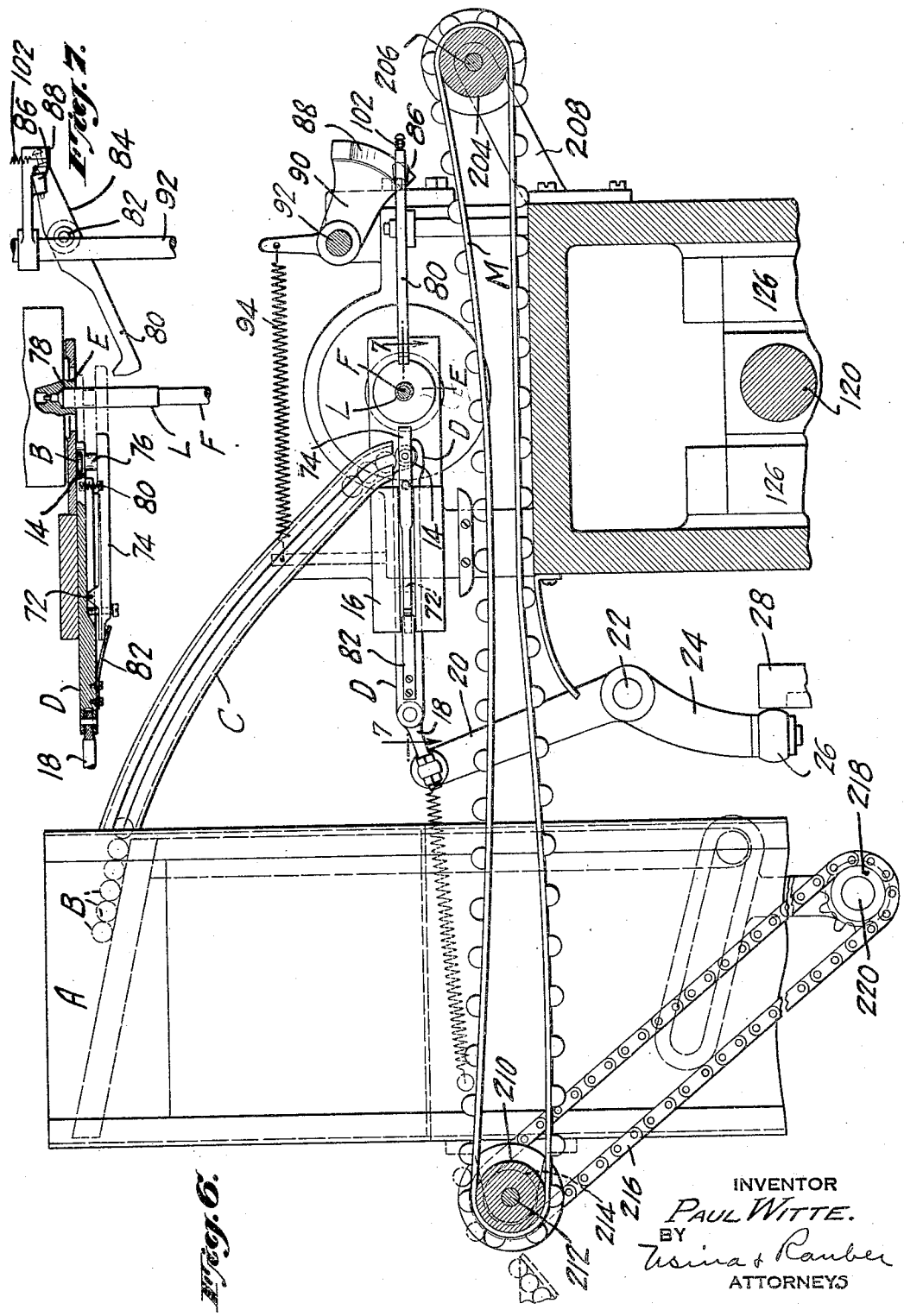

Nov. 8, 1932.   P. WITTE   1,886,459
AUTOMATIC MACHINE FOR MAKING TUBES
Filed April 21, 1932   5 Sheets-Sheet 4
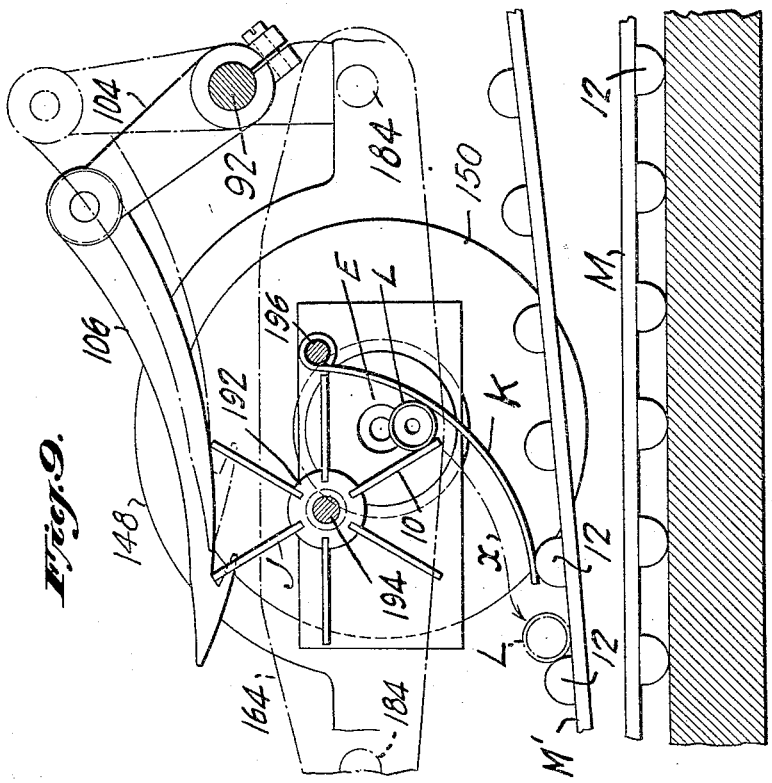
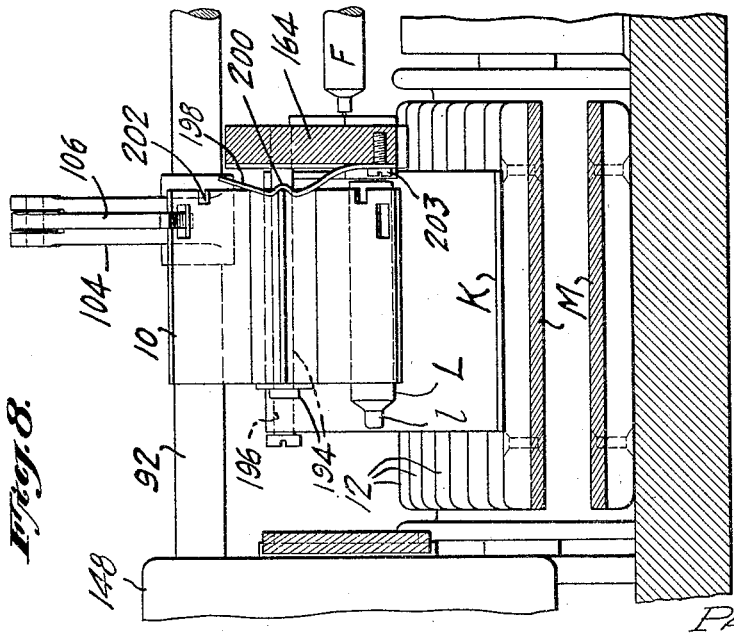
INVENTOR
PAUL WITTE.
BY HIS ATTORNEYS

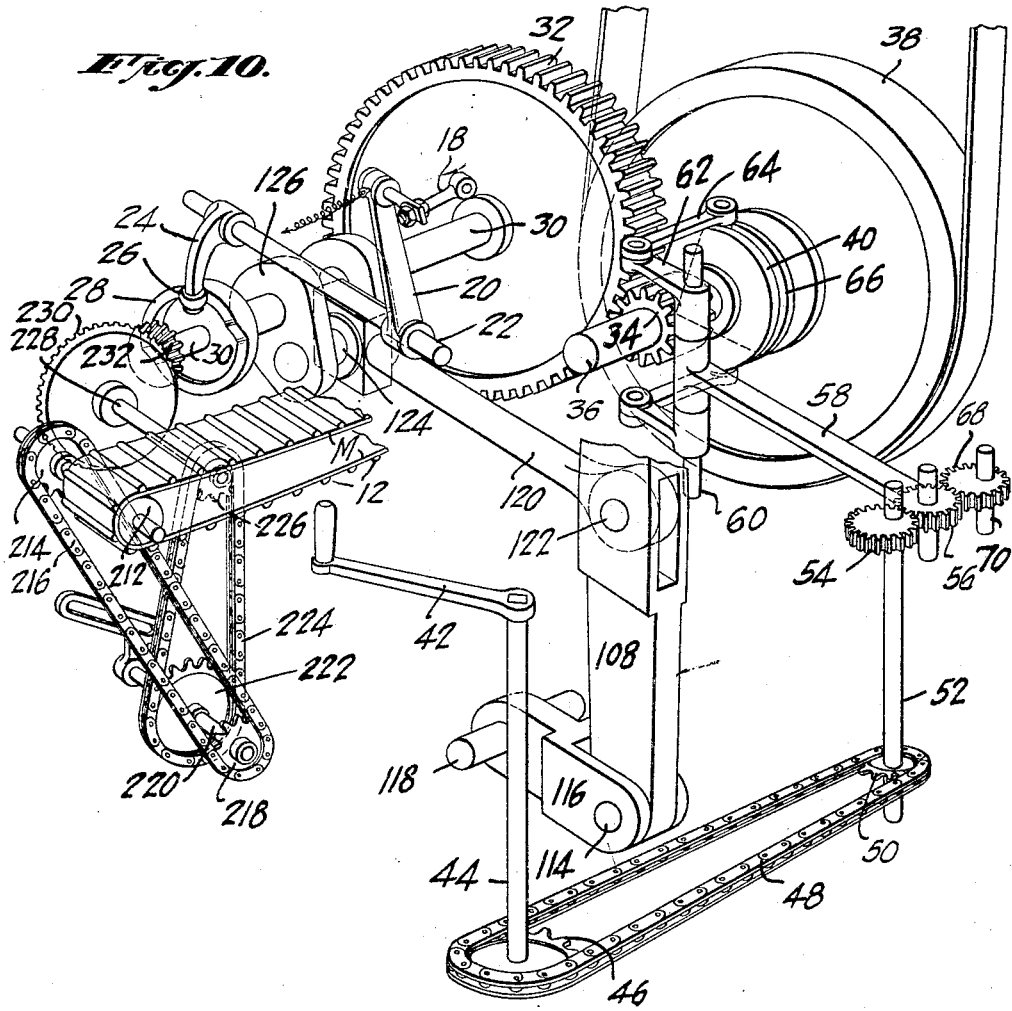

Patented Nov. 8, 1932

1,886,459

UNITED STATES PATENT OFFICE

PAUL WITTE, OF NEW MILFORD, NEW JERSEY, ASSIGNOR TO WHITE METALS MANUFACTURING COMPANY, OF HOBOKEN, NEW JERSEY, A CORPORATION OF NEW JERSEY

AUTOMATIC MACHINE FOR MAKING TUBES

Application filed April 21, 1932. Serial No. 606,600.

This invention relates to a machine for making tubes from ductile metal, such as block tin, white metal or the like.

The machine illustrated, which embodies the present invention, while not limited thereto, is well suited for the manufacture of collapsible tubes, such as used for dispensing tooth paste, shaving cream and somewhat similar plastic materials.

Heretofore such tubes have usually been made on machines of the punch press type having a vertically reciprocating plunger adapted to coact with a die for forming the tube on the plunger from a circular disc-like blank. One difficulty encountered with former machines is that of stripping the formed tubes from the plunger. To permit such stripping, the tube forming plunger is frequently carried by a horizontally swingable arm, which is adapted to move the plunger to a position out of line with the die, so as to permit an operator to remove the tube by hand.

Devices have also been heretofore used for dispensing with a hand stripping operation by the utilization of mechanism movable relatively to the plunger for stripping the tubes therefrom. In such former types of machines, the stripped tubes are usually released and permitted to drop an appreciable distance and they are sometimes stacked in boxes and transferred to mechanism for performing finishing operations on the formed tube, such as trimming off one end thereof and threading the neck for the reception of the closure cap.

In my improved machine, the longitudinal axis of the tube forming plunger is disposed horizontally, as distinguished from the vertically disposed plungers heretofore used. This horizontal disposition of the plunger enables me to strip the tube from the plunger immediately after its formation and to support the tube either during the stripping movement, or immediately thereafter, so that it does not fall any appreciable distance. With the improved machine, the stripped tube is received in horizontal position by a transfer member which delivers the tube in such position that its substantially horizontal cylindrical surface lies flat on the horizontal surface of a conveyor belt travelling immediately below the forming plunger. This conveyor receives tubes in succession and carries them away in a horizontally disposed position. This is of advantage, for it facilitates inspection of the finished tubes by an operator and it also properly positions the tubes so that their open ends can be readily aligned with the horizontally disposed mandrels of suitable tube finishing machines.

The foregoing and other novel features of improvement will be apparent from the following specification when read in connection with the accompany drawings.

In the drawings.

Fig. 2 is an enlarged vertical longitudinal section illustrating a tube forming plunger, its chief operating parts and related transfer and conveyor mechanism, the view being taken on line 2—2 of Fig. 1;

Fig. 3 is a transverse section on line 3—3 of Fig. 2 illustrating means for transferring the formed tube to the conveyor directly underlying the tube forming plunger;

Fig. 4 is a top plan view of Fig. 3 also showing adjacent mechanism;

Fig. 5 is a vertical transverse section on line 5—5 of Fig. 2 showing the plunger supporting carriage and related mechanism;

Fig. 6 is a transverse vertical section on line 6—6 of Fig. 2 illustrating means for feeding the blanks or slugs and also the conveyor carrying away the formed tubes (see also line 6—6 of Fig. 1);

Fig. 7 is a detail view partly in plan and partly in horizontal section on line 7—7 of Fig. 6;

Fig. 8 is an enlarged detail view illustrating the mechanism for transferring formed tubes to the underlying conveyor;

Fig. 9 is an elevation viewed from the right side of Fig. 8, parts being sectioned off;

Fig. 10 is a perspective view illustrating the main drive of the machine and showing mechanism for transmitting movement to the plunger carriage;

Fig. 11 is a detail view illustrating means for periodically lubricating the surface of the tube forming plunger;

Fig. 12 is a section on line 12—12 of Fig. 11;

Fig. 13 is a perspective detail view of the two halves of the tube stripper;

Fig. 14 is a view similar to Fig. 9, but illustrating a slight modification.

Figure 1:
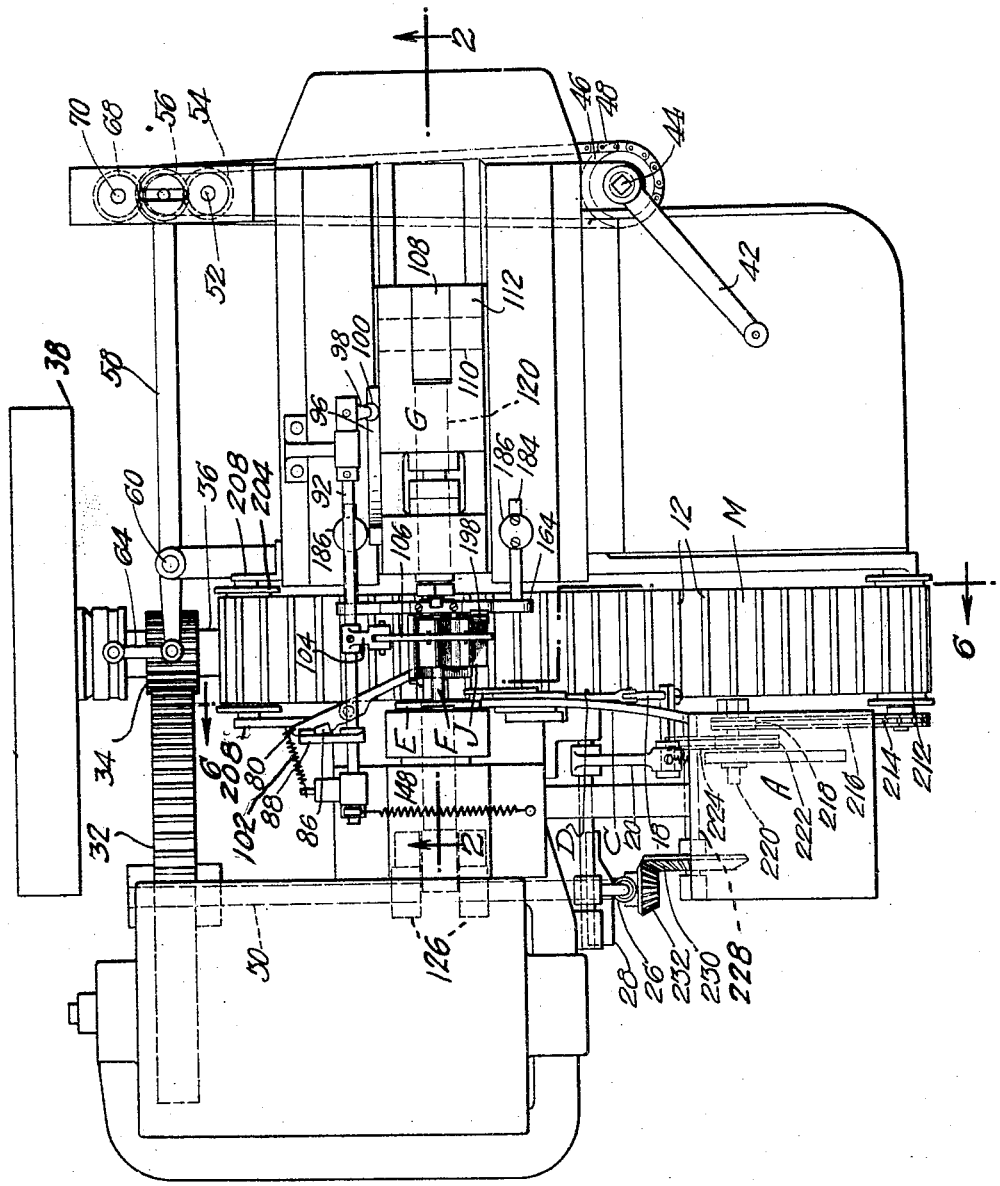
Fig. 1 is a plan view of a tube forming machine embodying the invention.

Referring first in a general way to the machine as a whole, there is a magazine A adapted to supply disc-like blanks or slugs B to a feed chute C. This chute delivers the blanks or slugs to a reciprocating feeder D, which is intermittently reciprocated so as to align the blanks with the die E. (Figs. 1 and 2).

Cooperating with the die, there is a horizontally disposed tube forming plunger F reciprocated by a carriage G traveling in suitable guides, all as hereinafter more fully referred to.

On the forward movement of the carriage, the plunger engages a blank which has been previously positioned in the die. This causes the extrusion of the ductile metal of the blank over the surface of the plunger, thus forming a tube thereon. As the plunger is retracted, a stripper H comes into play and upon continued rearward movement of the carriage the formed tube is stripped from the plunger while the same is in the confines of radial arms 10 of a transfer member J (Fig. 9). This transfer member coacts with the runway member K over which the formed tube L is adapted to roll until it strikes a transverse division 12 on the horizontally disposed conveyor M, which is located directly under the travels in a horizontal plane below the plunger.

Referring in greater detail to the drawings, as the blanks B reach the lower end of the feed chute C they fall into a notch 14 of the blank feeder D. This feeder is mounted in suitable guides 16 (Fig. 6). Movement is imparted to the feeder D through a link 18 connected to an arm 20, secured to a rock shaft 22. This shaft 22 carries lever 24 to the outer end of which is secured a roller member 26, which rides on a face cam 28. This cam is secured to a shaft 30, Fig. 10, which is driven through gear 32 and pinion 34 secured to the main drive shaft 36. This shaft is adapted to be driven from a pulley 38, a suitable clutch 40 being provided for controlling the stopping and starting of the machine.

The clutch 40 is adapted to be operated through mechanism such as shown in Fig. 10. This includes a control handle 42 carried by shaft 44 mounted in suitable bearings. This shaft at its lower end carries a sprocket 46 which connects by means of a chain 48 with another sprocket 50 secured to a shaft 52 mounted in suitable bearings. At its upper end, the shaft 52 carries an eccentrically mounted gear 54, which meshes with a gear 56 secured to the outer end of an arm 58 carried by a vertical rock shaft 60 mounted in suitable bearings (Figs. 1 and 10). This rock shaft also carries arms 62 which are connected by means of links 64 with a clutch operating ring 66. Coacting with the gear 56 secured to the arm 58, there is a gear 68 eccentrically mounted on a vertical shaft 70. The degree of eccentricity of the gears 52 and 68 is substantially equal. As thus arranged, when the shaft 52 is turned, because of the eccentric mounting of gears 54 and 68, the arm 58, which carries the gear 56, will be rocked about the axis of the vertical shaft 60, thus actuating the clutch.

As shown in Fig. 7, pivoted at 72 to the blank feeder D, there is a plate 74 carrying a projection 76 near its outer end, which is adapted, when the plate 74 is rocked about its pivot 72 to insert the blank B into the opening 78 of the die E. Springs 80 and 82 normally tend to hold the plate 74 in the position shown in Fig. 7. In this position, the projection 76 cooperates with the feeder D to confine the blank B within the notch 14 of the feeder.

On the back stroke of the plunger F, the previously formed tube is removed from the plunger, whereupon the cam 28 rocks the shaft 22, thus causing the feeder D to move forward to the dotted position indicated in Fig. 7. This will carry the blank B into alignment with the opening 78 in the die. Upon reaching this aligned position, an inserter member 80 is rocked about its pivot 82. This strikes a blow to the outer end of the plate 74 and causes the projection 76 to force the slug B into the opening 78 of the die. The inserter member has an arm 84, which at its outer end carries a tapered roller 86 arranged to ride on the cam surface 88 of a sector-shaped cam 90 secured to a rock shaft 92. This shaft is adapted to be rocked in one direction by a spring 94 and in the other direction by a cam 96 secured (Fig. 5) to the reciprocating carriage G, which supports the tube forming plunger F. The cam 96 transmits its rocking movement to the shaft 92 through an arm 98 secured to one extremity of the shaft, this arm carrying a roller 100 (see Figs. 1 and 5). A spring 102 normally tends to hold the roller 86 of the inserter arm against its actuating cam 88.

As thus arranged, it is clear that upon the rearward stroke of the plunger carriage G the plate cam 96, which reciprocates therewith, will rock the shaft 92, thus causing insertion of a blank in the die upon each backstroke of the plunger carriage. The rock shaft 92 also carries an arm 104 having a transfer member operating pawl 106 secured thereto. (See Figs. 9 and 1).

The pawl 106 intermittently turns the transfer member J through approximately ⅙ of a turn, so as to peridically release the formed tubes, as will hereinafter more fully appear. It is here observed, however, that the movements of the blank inserter and the transfer mechanism are synchronized or coordinated with the movements of the plunger F and its supporting carriage G.

The carriage G is actuated by an oscillating lever 108, this lever being connected with the carriage by a pin 110 secured in lugs 112 extending rearwardly from the back of the carriage. In order to permit of a straight line motion, the lever 108 is pivoted at 114 (as shown in Fig. 10) to a toggle link 116 supported by trunnions 118 carried in suitable bearings, not shown. The lever 108 is oscillated through a pitman 120 having a pivotal connection at 122 with the lever 108 and a similar connection with the crank pin 124 secured to crank arms 126 carried by the shaft 30. As thus arranged, it is clear that rotation of the shaft 30 and crank pin 124 will oscillate the carriage actuating lever 108 and during such oscillation the upper end of the lever 108 will partake of a straight line motion.

The carriage G supports a plunger holder 128, the rear end of which is in the form of a threaded shank 130 screwed to the carriage and adapted to be locked in adjusted position by nut 132. The shank carries another nut 134, the forward end of which engages a sleeve 136 seated against a shoulder 138. By manipulating the nuts 134 and 132, a longitudinal adjustment of the holder 128 can be readily and accurately secured, the nuts 132 and 134 being provided on their peripheries with suitable sockets for engagement with a spanner wrench.

At the forward end of the plunger holder 128, there is a chuck 140 having a tapered bore which coacts with the tapered member 142, which at different points is slotted so that, when the chuck 140 is screwed into the plunger holder 128, the tapered member 142 will tightly grip the shank of the tube forming plunger F and thus firmly hold it. This chuck arrangement permits the insertion in the plunger holder of plungers of different diameters, so as to adapt the machine for use in making tubes of different sizes.

The die E, with which the plunger F coacts in forming the tubes from the blank D, is removably supported in a die holder 144 having a shank 146 seated within an upstanding lug 148 formed on the bed of the machine. The die is retained in the die holder by means of a suitable cap nut 150. This arrangement permits of the use of dies of different sizes adapted for making tubes of different diameters.

As the carriage G moves forward to the position illustrated, for example, in Fig. 2, the plunger F in cooperation with the die E extrudes or forms a tube on the end of the plunger, as indicated at L. Upon the retraction of the plunger or the backward movement of the carriage, the tube is adapted to be stripped from the plunger and gently lowered to an underlying conveyor. The means for effecting this stripping and lowering of the tube constitutes an important part of the improved machine herein shown.

The stripper is best shown in Figs. 2 and 13 and the mechanism for transferring the tube to the conveyor after it has been stripped is best shown in Figs. 8 and 9. As shown in Fig. 13, the stripper H is preferably made in two parts, indicated at 152 and 154. These parts are provided with flanges 156 and 158, so as to form a locating or positioning groove 160. The groove 160 of the member 154 is seated on the curved surface 162 of a bridge member 164. A retaining member 166 engages the groove 160 of the upper half 152 of the stripper H, this retaining member being adapted to be secured to the bridge piece 164 by suitable cap screws 168 shown in dotted lines in Fig. 3. This split or two part construction of the stripper permits of ready insertion and removal of strippers having different sized bores to correspond with the different sized plungers adapted to be fitted to the machine. The bore 168' of the stripper is preferably tapered, as indicated in Figs. 2 and 13. This is deemed important because it provides for a relatively close sliding fit between the stripper and the plunger F at the forward end of the stripper and allows clearance at the rearward end of the stripper. This permits smooth operation and avoids any tendency of the stripper to exert undue friction on the plunger.

The member 152 of the stripper has an aperture 170 formed thereon. This is to permit the application of lubricant to the plunger. The means for applying this lubricant is shown in Figs. 11 and 12. The lubricant is applied by a piece of wicking 172 secured in a tubular member 174 carried at the outer end of a lever 176, pivoted at 178 to the bridge 164.

The tubular member 174 projects into the aperture 170 of the stripper and is periodically rocked so as to bring the wicking and the lubricant carried thereby into engagement with the plunger. The rocking movement of the lever 176 is effected by means of a cam 180 carried by the rock shaft 92 hereinabove referred to. A tension spring 182 tends to move the wicking away from the plunger. The upper part of the tube 174 serves as a reservoir for lubricating oil which is filled from time to time with an oil can. One filling suffices for a long period of operation. In the arrangement described, it will be understood that upon each stroke of the plunger carriage, the cam 180 actuates the lever 176 and causes the application of a small quantity of lubricant to the plunger. This facilitates its smooth and even movement through the stripper and also insures the tube can be freely removed from the plunger without mutilating it. By aperturing the stripper and applying the lubricant in the apertured part, I am enabled to secure an effective distribution over the surface of the plunger. A film of the lubricant tends to follow the outline of the tapered surface of the opening 168 in the plunger and thus evenly distributes the lubricant over the entire surface of the plunger as the same reciprocates back and forth through the stripper.

Referring to Fig. 5, it will be seen that the bridge 164 above referred to, which supports the stripper, is secured in place on the ends of parallel rods 184 carried by upstanding bosses 186 secured to the grooved carriage guide bars 188, which in turn are secured in a recessed seat 190 formed in the bed of the machine.

The collapsible tubes L formed on this machine usually have a neck portion $l$, Fig. 8, adapted to be subsequently threaded to receive a closure cap. This results in making the neck end of the tube heavier than the other parts. Thus on a horizontal machine, it is important to provide means for receiving the tube as it is stripped from the plunger in such manner that it will not fall neck first or on the skew. In order to prevent damage to the tube immediately after it is stripped from the plunger and to prevent its falling on an angle or in a haphazard manner, I provide the transfer mechanism, indicated as a whole at J (see Fig. 9), which is adapted to gently control the movement of the tube to the conveyor belt M, which travels immediately below the plunger.

This transfer member J, in the embodiment of the invention best shown in Figs. 3, 8 and 9, includes a central hub 192 having a plurality of radial plate-like arms 10, there being six such arms shown in the embodiment of the invention illustrated. The hub 192 is rotatably supported on a stub shaft 194 secured to the bridge piece 164. Also secured to the bridge piece, there is a screw stud 196 for supporting the curved runway plate K.

The parts of the runway K and the transfer member J are so located with respect to the plunger F and die E that immediately a tube is stripped from the plunger, it is prevented from falling by one of the radial arms 10 of the transfer member. In fact, during the end of the stripping movement the neck end of the tube may be momentarily supported by arm 10. In some cases, as illustrated in the modification of Fig. 14, the arms $10^a$ may have their ends curved, as indicated at $10^b$ and may be so arranged that the tube is actually supported during the stripping movement. This however, in some cases is not essential as no particular damage will result to the tube if it falls a very small distance, as indicated for example by the distance between the tube L in Fig. 9 and the center of the opening in the die E. After the tube L has been stripped from the mandrel, the continued backward movement of the carriage G causes cam 96 to rock shaft 92. This will move the pawl 106 to the dotted position of Fig. 9, thus permitting the stripped tube to roll down the plate K, as indicated by the arrow $x$. Thus the tube will be deposited on a horizontal surface of the traveling conveyor M in a space thereon located between two of the strips 12. Thus the completed tube can be carried away while resting in a horizontal position on its cylindrical surface. On the next forward movement of the carriage, the pawl 106 will be returned to the full line position of Fig. 9. In order to prevent the turning movement of the transfer member J during the forward stroke of the pawl, I provide an impositive lock 198 which, as shown in Fig. 8, is in the form of a spring steel strip having a notched portion 200 for successive engagement with the edges 202 in slotted parts of the arms 10 of the transfer member J. The spring lock 198 is secured to the bridge piece 164 by screw 203.

The transfer mechanism described is advanced one step upon each rearward stroke of the carriage G and plunger F, hence as the plunger moves forward it will move through a tube receiving space defined by two of the arms 10 of the plunger and the runway plate K and upon the backward stroke of the carriage the turning of the transfer member J will cause the tube to gently roll down the curved runway plate, its movement being controlled by the arm 10. The traveling conveyor M being located close to and directly under the plunger is advantageous because the stripped tube, therefore, needs to travel only a very short distance and it has no opportunity to gather such momentum as would be likely to distort it upon coming to rest on the conveyor.

The conveyor M, as shown in Fig. 6, is supported at one end on an idle roller 204 secured to shaft 206 mounted in suitable bearings in the brackets 208. At its other end, the conveyor belt passes around a drive roller 210 secured to a shaft 212. This shaft carries a sprocket wheel 214 (Fig. 10) which is driven by means of a chain 216 which passes around a sprocket 218 on a shaft 220 carrying another sprocket 222, which is driven by a chain 224 from a sprocket 226 secured to a shaft 228 having a bevelled gear 230 thereon, which meshes with a bevelled pinion 232 secured to the shaft 30 hereinabove referred to. This drive moves the conveyor continuously, but at such a linear speed that upon each stroke of the carriage the conveyor is advanced a sufficient distance to bring one of the cross pieces 12 thereof into a position to receive each tube stripped from the plunger.

From the foregoing, it is apparent that the described machine provides a horizontally reciprocating plunger cooperating with a die and means for periodically inserting blanks in the die and that upon forward movement of the carriage the tube is formed on the plunger. Upon the rearward movement of the carriage and plunger, the tube is stripped therefrom. During this stripping movement, the arms of the transfer member J may, as shown in Fig. 14, support the free ends of the tube substantially in alignment with the plunger during the stripping operation. Upon rotation of the transfer member J, the arms 10 thereof control the gentle lowering of the tube to the conveyor which has a supporting surface disposed in a horizontal plane and travelling immediately under the plunger, so that the tube is not likely to be damaged by impact. It will be understood that upon each movement of the plunger lubricant is applied thereto, so as to facilitate the smooth operation of the parts and the easy removal of the tube from the plunger. The general arrangement and construction of the parts is such that plungers and dies of different sizes can be utilized, so as to make tubes of varying diameters. Utilization of the two part stripper and the retainer therefor provides means whereby changing from one size to another can be readily made.

Various modifications may be made by those skilled in the art without departing from the invention as defined in the appended claims.

What I claim is:—

1. A machine for making collapsible tubes including a plunger on which the tubes are formed, means for automatically stripping the tubes from the plunger, transfer means synchronized with the movements of the plunger and constructed and arranged to receive and momentarily support each tube immediately as it is stripped from the plunger and a conveyor arranged to receive the tubes from said transfer means.

2. A machine for making collapsible tubes including a plunger on which the tubes are formed, means for automatically stripping the tubes from the plunger, a member having a plurality of tube receiving portions adapted to successively receive a tube directly as it is stripped from the plunger and means synchronized with the movements of the plunger for successively bringing each of said portions to tube receiving position and a conveyor arranged to receive tubes from said member.

3. A machine for making collapsible tubes comprising a reciprocating plunger on which the tubes are formed, fixed means embracing the plunger for stripping the tubes therefrom as the plunger is retracted, a transfer member movable about an axis substantially parallel to that of the plunger, a conveyor having a tube receiving surface which travels in a plane substantially parallel with the longitudinal axis of the plunger and means for imparting movement to said transfer member near the end of the retracting stroke of the plunger so as to transfer the tube to said conveyor upon its removal from the plunger.

4. A machine for making collapsible tubes, including a plunger on which the tubes are formed, means for automatically stripping the tubes from the plunger, a rotatable member having a plurality of tube receiving portions between which the plunger successively reciprocates and means for successively bringing each of said receiving portions to tube receiving position.

5. A machine of the character described comprising a horizontally reciprocating plunger on which tubular articles are formed, a supporting member rotatable on a horizontal axis having a plurality of article receiving portions between which the plunger reciprocates successively and means synchronized with the movements of the plunger for intermittently turning said member through a predetermined angle, and means normally embracing the plunger and effective upon one stroke thereof to strip the article within the confines of adjacent article receiving portions of said rotatable member.

6. A machine of the character described comprising a horizontally reciprocating plunger on which tubular articles are formed, a supporting member rotatable on a horizontal axis having a plurality of article receiving portions between which the plunger reciprocates successively and means synchronized with the movements of the plunger for intermittently turning said member through a predetermined angle, and means normally embracing the plunger and effective upon one stroke thereof to strip the article within the confines of adjacent article receiving portions of said rotatable member and travelling means below said member for receiving the articles released by the turning movement thereof.

7. A machine for making collapsible tubes, including a plunger on which the tubes are formed, means for automatically stripping the tubes from the plunger, means receiving and momentarily supporting each tube in substantial alignment with the plunger immediately after it is stripped therefrom and means effective to release the tube from said receiving means.

8. A machine for making collapsible tubes including a plunger on which the tubes are formed, means for automatically stripping the tubes from the plunger, a rotatably mounted member having a plurality of arms each adapted to be successively stopped in a position substantially or approximately tangent to the tube so as to support the free end thereof while it is being stripped from the plunger, and means for intermittently turning said arms through a predetermined angle.

9. A machine for making tubular articles comprising a horizontally reciprocating plunger on which the articles are formed, a fixed stripper normally embracing the plunger and adapted to strip the articles from the plunger as it moves relatively thereto, means for supporting the free ends of the articles substantially in alignment with the plunger during the stripping operation and means for releasing the articles from said supporting means.

10. A machine for making tubular articles comprising a horizontally reciprocating plunger on which the articles are formed, a fixed stripper normally embracing the plunger and adapted to strip the articles from the plunger as it moves relatively thereto, means for supporting the free ends of the articles substantially in alignment with the plunger during the stripping operation and means for releasing the articles from said supporting means and a conveyor travelling below said supporting means for successively carrying away the articles.

11. A machine for making tubular articles comprising a horizontally reciprocating plunger on which the articles are formed, a fixed stripper normally embracing the plunger and adapted to strip the articles from the plunger as it moves relatively thereto, means for supporting the free ends of the articles substantially in alignment with the plunger during the stripping operation, and means for releasing the articles from said supporting means and a conveyor belt having a plurality of transversely disposed strips secured thereto defining separate sections for successively receiving the articles as they are released by said supporting means.

12. A machine for making collapsible tubes or the like which comprises, a die, a plunger cooperating therewith on which the tubes are formed, a carriage movable in a substantially horizontal plane carrying said plunger, a fixed stripper embracing said plunger, a rotatably supported member having substantially radial arms, each being adapted to support the free end of a tube during the stripping operation, and means actuated by the movement of said carriage for successively bringing each of said arms to a position substantially tangent to a tube carried by said plunger.

13. A machine for making collapsible tubes or the like which comprises, a die, a plunger cooperating therewith on which the tubes are formed, a carriage movable in a substantially horizontal plane carrying said plunger, a fixed stripper embracing said plunger, a rotatably supported member having substantially radial arms, each being adapted to support the free end of a tube during the stripping operation, and means actuated by the movement of said carriage for successively bringing each of said arms to a position substantially tangent to a tube carried by said plunger and yielding means for impositively locking each of said arms in its operative supporting position.

14. A machine for making collapsible tubes or the like, which comprises, a die, a plunger cooperating therewith on which the tubes are formed, means for reciprocating the plunger axially in a horizontal plane, a stripper comprising separable parts embracing the plunger and having a tapered bore the smaller diameter of which just clears the plunger, a fixed bridge plate supporting the stripper, and carrying means for detachably securing said stripper, and means for supporting the free end of the tube while the plunger is being withdrawn from the tube.

15. A machine for making collapsible tubes or the like which comprises a die, a plunger cooperating therewith on which the tubes are formed, means for reciprocating the plunger toward and away from said die, a stripper through which the plunger reciprocates, and means movable in timed relation with the movements of the plunger for periodically applying a small quantity of lubricant to the plunger.

16. A machine for making collapsible tubes or the like which comprises a die, a plunger cooperating therewith on which the tubes are formed, a reciprocating carriage supporting the plunger, a tube stripper through which the plunger reciprocates, and means actuated in response to the reciprocating movement of the carriage for applying lubricant to the plunger.

In witness whereof, I have hereunto signed my name.

PAUL WITTE.